United States Patent

[11] 3,601,158

| [72] | Inventor | Lawrence Knight Edwards<br>Palo Alto, Calif. |
|---|---|---|
| [21] | Appl. No. | 15,057 |
| [22] | Filed | Feb. 27, 1970 |
| [45] | Patented | Aug. 24, 1971 |
| [73] | Assignee | Tube Transit Corp.<br>Palo Alto, Calif. |

[54] HIGH-SPEED GROUND TRANSPORTATION SYSTEM
26 Claims, 17 Drawing Figs.

[52] U.S. Cl. .................................................. 138/106,
   61/43, 104/156
[51] Int. Cl. .................................................. F16l 3/08,
   F16l 5/00
[50] Field of Search ........................................... 138/106,
   107, 108, 111, 112; 61/43, 44; 104/156

[56] References Cited
UNITED STATES PATENTS
| 907,356 | 12/1908 | Hoff | 61/43 |
|---|---|---|---|
| 1,681,731 | 8/1928 | Gottwald | 138/106 |
| 3,404,638 | 10/1968 | Edwards | 104/156 |

*Primary Examiner*—Samuel Rothberg
*Attorney*—Koenig, Senniger, Powers and Leavitt

ABSTRACT: A spring suspension for a pair of tubes of a high-speed ground transportation system, each tube having rails for travel therethrough of a wheeled vehicle. The tubes extend side-by-side normally through a tunnel with a space between the tubes. Each tube is supported for vertical springing on a resilient bed comprising a series of resilient crossbeams, and for horizontal springing by means of a laterally resilient keel underneath the tube bearing on the crossbeams, the keel being laterally adjustable on the crossbeams. Two sets of adjustable-length spring compression links are interposed between the tubes, the links of the two sets being oppositely inclined, and alternating with one another along the length of the tubes.

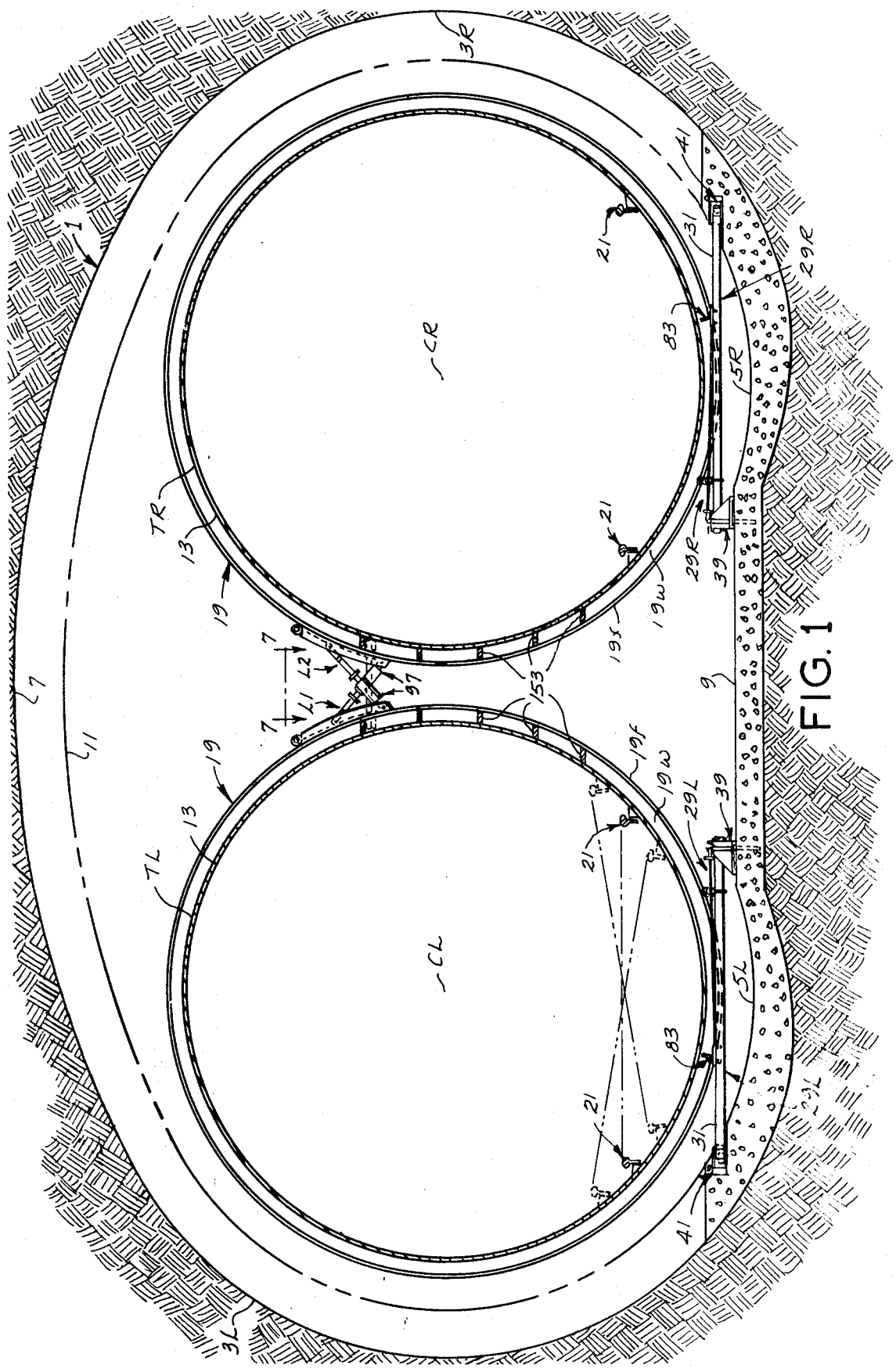

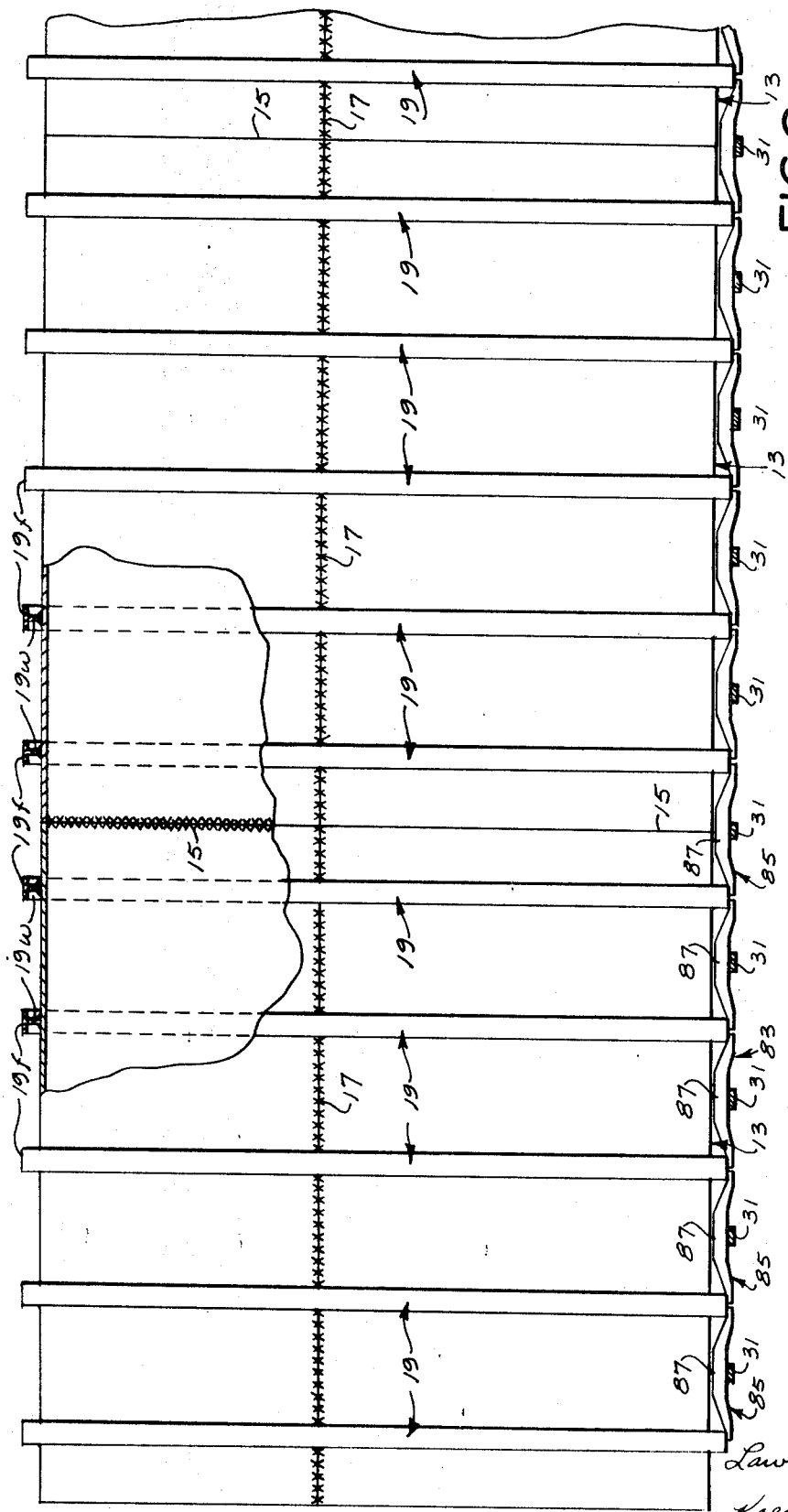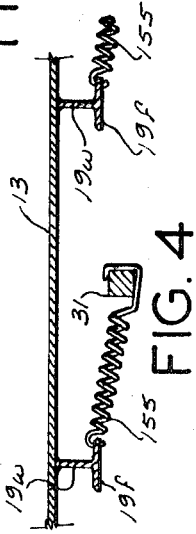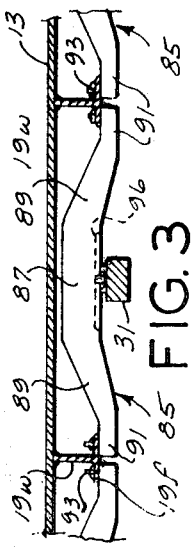

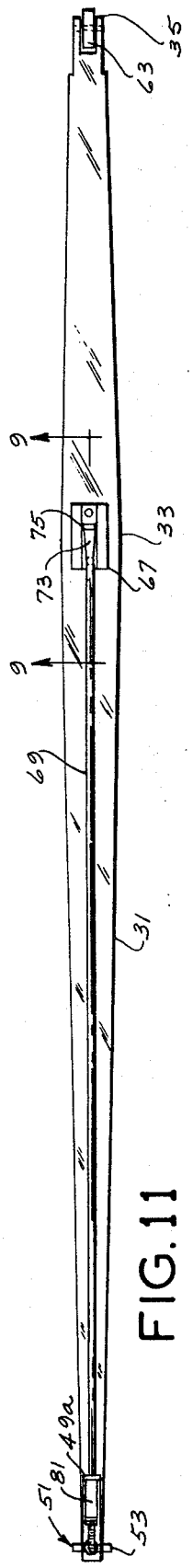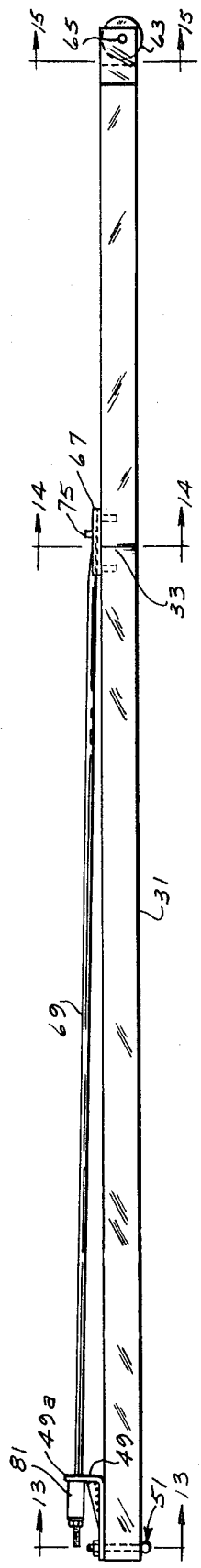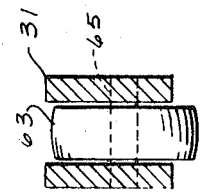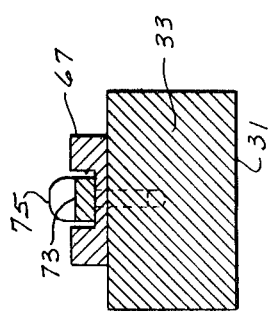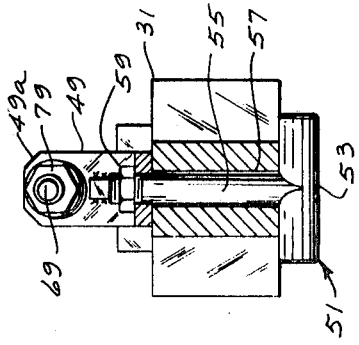

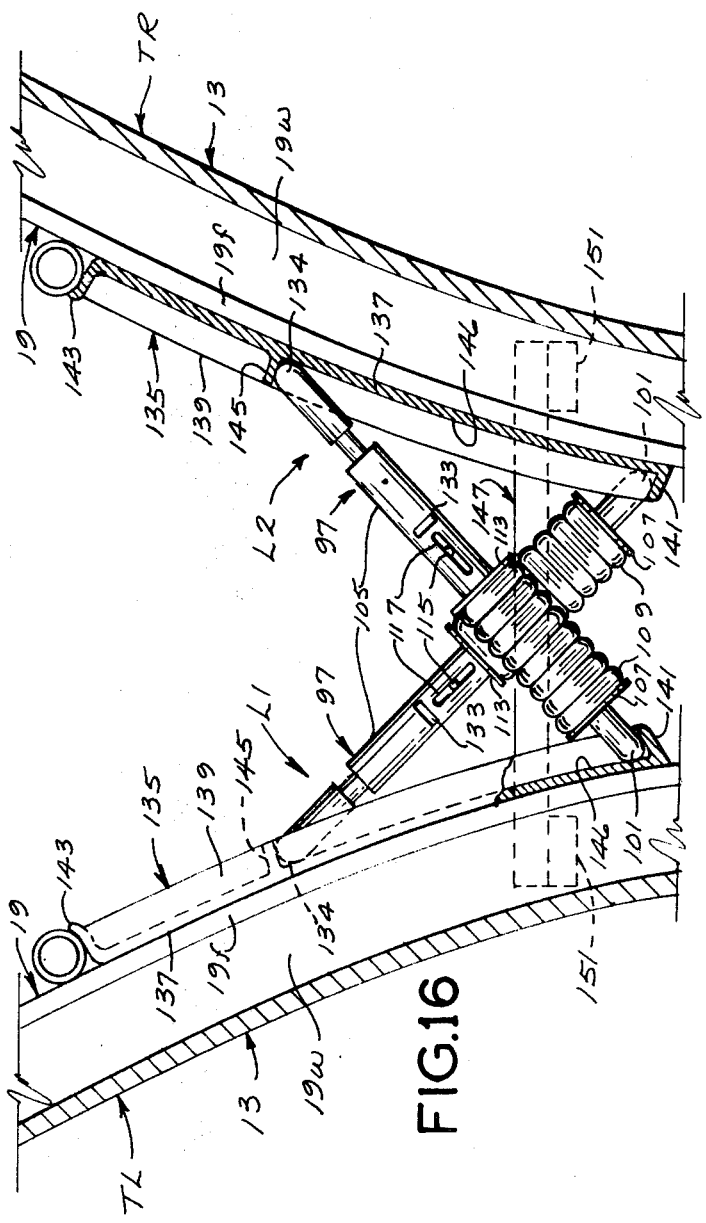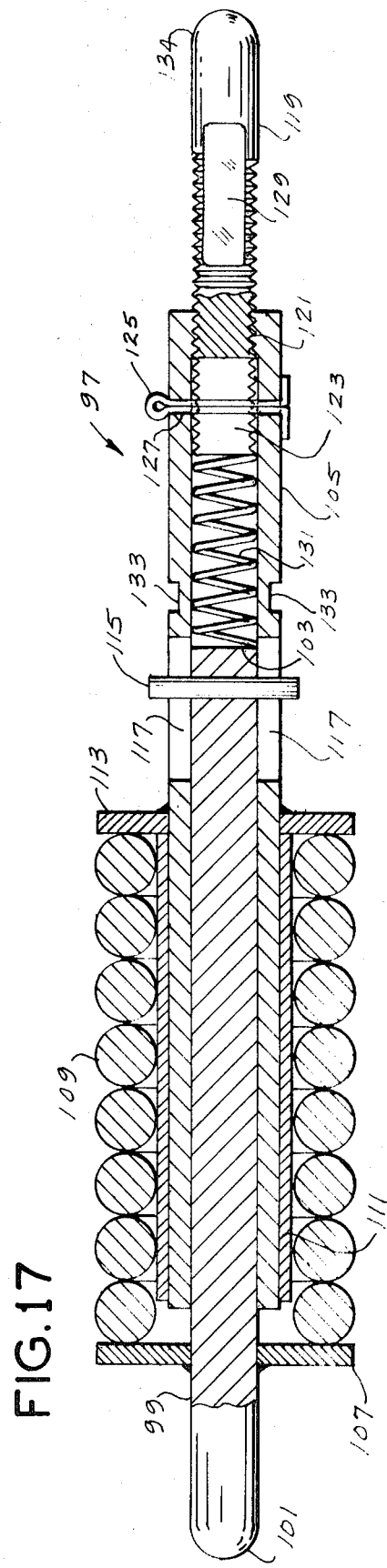

3,601,158

HIGH-SPEED GROUND TRANSPORTATION SYSTEM

BACKGROUND OF THE INVENTION

This invention relates to high-speed ground transportation systems, and more particularly to such a system wherein wheeled vehicles are propelled at high speeds through tubes having tracks therein for the wheels of the vehicles.

The invention is particularly concerned with systems of this class having two side-by-side tubes for travel of vehicles therethrough in opposite directions, such as shown in FIG. 8 of my prior U.S. Pat. No. 3,404,638, issued Oct. 8, 1968, entitled High-Speed Ground Transportation Systems and in FIGS. 4 and 5 of my prior U.S. Pat. No. 3,438,337, issued Apr. 15, 1969, entitled High-Speed Ground Transportation System. U.S. Pat. No. 3,404,638 refers to the floating mounting of a tube, by means of a liquid or by means of springs (FIG. 5), and this invention involves a special spring suspension system for the two side-by-side tubes of a double-tube system.

SUMMARY OF THE INVENTION

Among the several objects of this invention may be noted the provision of a spring suspension system for a pair of tubes of a high-speed ground transportation system of the class above-described which:

a. Permits adjustment of the tubes vertically and laterally;

b. Controls the loads on the tubes and on the foundation in such manner that these loads increase only a small amount even if one support is maladjusted (or even missing completely);

c. Gives a degree of isolation from earthquake vibrations or slight local shift in the supporting ground; and d. Provides for transmission of loads from the tubes to the supporting earth essentially in downward direction, thereby avoiding the need for tension ties into the surrounding earth (or concrete tunnel liner when the tubes are in a concrete-lined tunnel); and which, in addition to the above, e. Provides for roll adjustment of each tube;

f. Permits each one of the tubes readily to be shifted vertically, laterally, in roll, and any combination of these motions, independently of the other tube;

g. Enables all adjustments to be made by workmen in the area generally between the two tubes;

h. Employs gravity bias in the lateral direction so that the weight of each tube maintains a positive load on the transverse adjustment mechanism, thereby simplifying the construction and manipulation of the latter;

i. Provides positive longitudinal freedom (at least for a limited distance such as ±2 inches) between the two tubes, thereby accommodating construction tolerances and the natural tendency of one tube to lengthen or shorten relative to the other under differential temperature conditions (particularly near the ends of the tubes where differential temperatures will be the greatest), and accommodating a longitudinal shift of one tube such as may occur momentarily on emergency stopping of a vehicle in that tube;

j. Is so constructed as to avoid excessive softness of the spring suspension in the transverse direction, thereby avoiding dynamic problems;

k. Provides for control of longitudinal shift of the tubes and opposition to a longitudinal load buildup on a long slope;

l. Is so constructed (by having all the supporting and adjusting elements individually removable) as to facilitate maintenance or replacement of these elements and provide universal access to the tubes and the surrounding tunnel;

m. Has means between the tubes for supporting workmen needing access to the upper portions of the tubes, while accommodating the above-mentioned relative longitudinal shift of the tubes; and n. Enables quantitative measurement at any time by simple methods of loads entering the tube through the various springs of the suspension.

In general, a high-speed ground transportation system of this invention comprises a pair of tubes extending side by side each adapted for travel therethrough of a vehicle, means for supporting the tubes, and means mounting said tubes on said supporting means in the manner of a three-hinged arch comprising a lower hinge connection between each tube and the supporting means and an upper hinge connection between the two tubes above the level of the lower hinge connections, the tubes being free of one another apart from said upper hinge connection and said supporting means. Other objects and features will be in part apparent and in part pointed out hereinafter.

BRIEF DESCRIPTION OF THE DRAWINGS

FIG. 1 is a transverse section of a pair of tubes mounted in a tunnel in accordance with this invention, and showing in dotted lines in the left-hand tube the extreme position of tracks in the tube for maximum curvature (i.e., a 10° bank);

FIG. 2 is a side elevation of one of the two tubes, with parts thereof broken away and shown in section;

FIG. 3 is a fragmentary longitudinal section of a portion of a tube showing detail of a keel plate;

FIG. 4 is a fragmentary longitudinal section of another portion of a tube, showing certain springs for controlling longitudinal shift of the tube;

FIG. 11 is a plan of a resilient beam of the spring suspension;

FIG. 12 is a side elevation of the FIG. 11 resilient beam;

FIGS. 13, 14 and 15 are enlarged vertical sections on lines 13—13, 14—14 and 15—15, respectively, of FIG. 12;

FIG. 16 is an enlarged fragment of FIG. 1 showing certain links which are interposed between the two tubes; and FIG. 17 is a longitudinal section of one of the links shown in FIG. 16.

Corresponding reference characters indicate corresponding parts throughout the several views of the drawings.

DESCRIPTION OF THE PREFERRED EMBODIMENT

Figure 8:
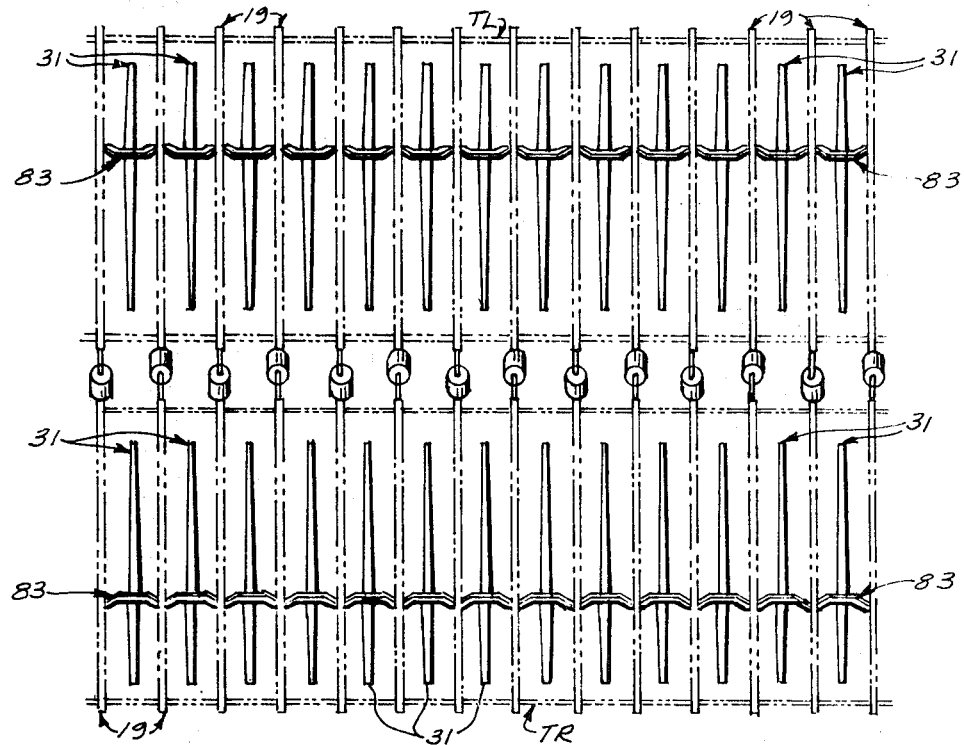
FIG. 8 is a plan of the spring suspension system for the tubes.
Figure 9:
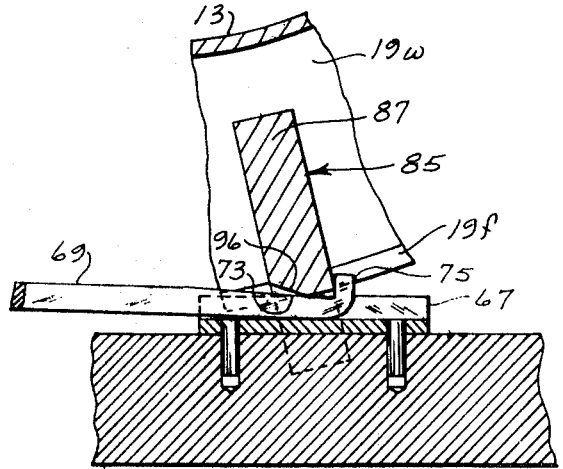
FIG. 9 is an enlarged vertical section on line 9—9 of FIG. 11.
Figure 10:
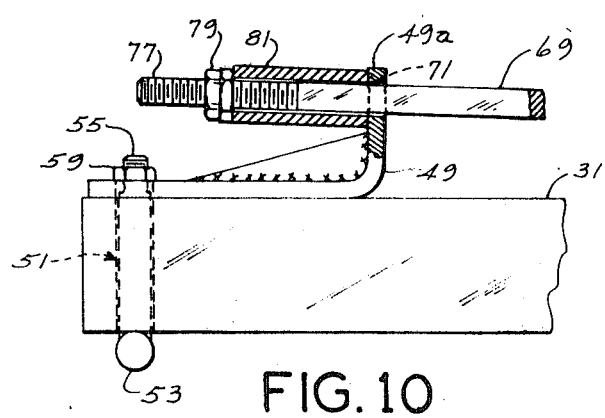
FIG. 10 is an enlarged fragment of FIG. 12, with parts broken away and shown in section.

Referring to the drawings, first more particularly to FIG. 1, there is indicated at 1 a tunnel (corresponding generally to the tunnel indicated at 5a in FIG. 8 of U.S. Pat. No. 3,404,638) of a high-speed ground transportation system such as described in said U.S. patent and also in U.S. Pat. No. 3,438,337. Two tubes TL and TR (corresponding generally to the tubes indicated at 1 in said U.S. Pat. No. 3,404,638) extend side by side through this tunnel, each tube being adapted for propulsion therethrough of a vehicle (not shown herein, but such as indicated at 3 in said patents).

More particularly, the tunnel as herein shown is of generally reniform cross section, having left and right sides 3L and 3R and lateral floor portions 5L and 5R curved on circular arcs drawn on centers indicated at CL and CR, an arched ceiling 7 and a flat central floor portion 9 (between the lateral curved floor portions 5L and 5R). The tunnel may be lined with concrete, as indicated at 11, as when it is bored through weak or fractured rock.

The tubes TL and TR are generally identical, each comprising a cylindrical shell made of individual annular sheet metal sections 13 welded together end to end as indicated at 15. Each section 13 is indicated as having a longitudinal welded seam 17. Each tube has reinforcing ribs or rings 19 extending around the tube on the outside thereof, these reinforcing rings being spaced at equal intervals along the length of the tube. Each reinforcing ring 19, as herein illustrated, is of T-shape in cross section, and is bent to circular shape with its flange 19f on the outside, having the edge of its web 19w welded to the outside of the tube. The vehicle which is propelled through each tube is a wheeled vehicle, and rails 21 are provided in each tube on which the wheels of the vehicle run. Each rail 21 has a bulb 23 on a web 25; the web is bolted to a backup bar 26 welded to gussets 27 which are in turn welded to the inside of the tube at the location of each reinforcing ring 19. As shown, the two rails in each tube are located at opposite sides of the tube toward its bottom. In straight sections of each tube, the rails are at the same level (as shown in the tube TR in FIG. 1). In curved sections of each tube, the rails would be banked as shown in dotted lines in the tube TL in FIG. 1, showing the extreme positions of the tube and rails for maximum curvature (e.g., a 10° bank).

Spring bed means indicated generally at 29L is provided in the tunnel for floatingly supporting the tube TL, and spring bed means indicated generally at 29R is provided in the tunnel for floatingly supporting the tube TR. Each of these tube-supporting spring bed means comprises a series of resilient crossbeams such as indicated at 31 spaced at relatively close equal intervals along the length of the tube. Each resilient beam (see particularly FIGS. 3–10) is constituted by a spring bar of generally rectangular cross section of constant height throughout its length but of varying width, having an intermediate section at 33 of maximum width and tapering in width from this section to its outboard and inboard ends 35 and 37. Section 33 of the bar, as herein illustrated, is located approximately one-third of the length of the bar from its outboard end 35.

Each spring bar, which may be made of suitable spring steel, for example, has its inboard end 37 mounted by means indicated generally at 39 for vertical adjustment and has its outboard end 35 mounted by means indicated generally at 41 against vertical movement while having freedom to move in the direction of length of the bar. The means 39 for mounting the inboard end of the spring bar comprises a bracket having a base 43 and spaced sidewalls 45 extending up from the base, with lateral reinforcing gussets 47 for the sidewalls on the outside thereof adjacent but spaced from one end of the bracket constituting its inboard end. The sidewalls 45 have inclined upper edges 45a outboard of the gussets, and a series of vertically spaced holes 48 inboard of the gussets.

The brackets 43 for mounting the inboard ends of the resilient beams 31 are mounted on the flat central floor portion 9 of the tunnel, at the respective sides of this flat floor portion, spaced at intervals corresponding to the spacing of the reinforcing rings 19 of the tube and located generally centrally between the vertical planes of the rings 19 of the tube. Each beam 31 has an L-shaped member 49 mounted on the top thereof at its inboard end by means of a T-bolt generally designated 51, having a crosshead 53 and a shank 55. The crosshead 53 engages the bottom of the beam adjacent the inboard end of the beam and the shank extends up through a hole 57 in the bar and the horizontal leg of the member 49, a nut 59 being threaded down on the upper end of the shank. The inboard end of the beam 31 extends between the sidewalls 45 of the bracket 39 bearing on a cross-pin 61 inserted in a particular set of the holes 48 in these sidewalls for adjusting the height of the inboard end of the beam (and hence the vertical position of the tube).

The means 41 for mounting the outboard end 35 of each beam 31 against vertical movement while providing for freedom of the outboard end of the beam to move in the direction of length of the beam comprises a roller 63 on a horizontal shaft 65 at the outboard end of the beam, which rolls on the bottom of a cylindrical socket 67 in the concrete lining 11.

A channel-section guide 67 is mounted on the top of each beam 31 at its section 33. An elongate rod 69 extends through a hole 71 in the vertical leg 49a of the member 49 and along the top of the bar to the guide 67. The rod has a flattened end portion 73 slidable in the guide 67 and its end is bent up to form a hook 75 extending up out of the guide. The guide is preferably made of bearing material such as sintered bronze impregnated with oil. The inboard end portion of the rod inboard of the vertical leg 49a of member 49 is threaded as indicated at 77, and has a self-locking adjustment nut 79 threaded up thereon against the end of a tubular spacer 81 surrounding the rod between the nut 79 and the leg 49a.

Each tube TL and TR has a keel indicated generally at 83 at the bottom thereof which bears on the guides 67 on the spring crossbeams 31, inboard of the upturned hook ends 75 of the rods 69. The keel is formed of a plurality of individual keel plates 85 each extending from ring 19 to ring 19 of the tube, with the keel plates all in a common plane extending radially outward in relation to the tube. Each keel plate 85 is formed of relatively thick steel plate (seven-eighths inch thick, for example) and has a relatively deep central portion 87, downwardly angled tapered portions 89 extending from the ends of the central section, and horizontal end extensions 91 which engage the outside of rings 19 and by means of which the keel plates are secured to the rings by pins 93. The keel plate has its ends attached by pins 93 to two adjacent rings 19 with the central portion of the plate offset upward from said ends. The central portion is beveled at the bottom on one side as indicated at 96, and its bottom edge bears on a guide 67 on a respective beam 31 inboard of the end hook 75 of the respective rod 69.

Two sets of spring links, one set being indicated at L1 and the other at L2, are interposed between the tubes TL and TR in the space therebetween above the horizontal central plane of the tubes. Each link in each set is generally designated 97. The links in set L1 alternate with the links in set L2, the links in set L1 being angled downward from tube TL to tube TR and the links in set L2 being oppositely angled (i.e., angled downward from tube TR to tube TL). As shown in FIG. 17, each link 97 comprises a rod 99 of circular cross section having a rounded end 101 and a flat end 103. A tube 105 surrounds the rod and is axially slidable thereon. The tube is longer than the rod and extends from adjacent a collar 107 secured to the rod adjacent its rounded end 101 well past the flat end 103 of the rod. A coil compression spring 109 surrounds the tube (and a spacer 111 on the tube) and reacts from collar 107 against a collar 113 secured on the tube to bias the tube in the direction toward the end 103 of the rod.

Axial movement of the tube relative to the rod is limited and rotation of the tube relative to the rod is prevented by a cross-pin 115 pressed in a transverse hole in the rod having its ends received in longitudinal slots 117 in the tube. A rod 119 forming an extension of the tube is adjustably threaded as indicated at 121 in the outer end of the tube. The inner end of this extension is axially slotted as indicated at 123 to receive a cotter pin 125 inserted through a cotter pinhole 127 in the tube adjacent its outer end. The extension has flats 129 at opposite sides thereof in planes parallel to the diametrical plane of the slot 123 for application of a tool to turn the rod extension. A coil compression spring 131 constituting a secondary biasing spring reacts from the flat end 103 of the rod against the inner end of the extension 119 to bias the tube in the same direction as the main spring. The tube has flats 133 at opposite sides thereof adjacent the outer ends of slots 117 for application of a pliers-type tool to compress the main spring for installation, removal or adjustment of the link. The outer end of extension 119 is rounded as indicated at 134. It will be observed that rod 99 and the assembly of tube 105 and rod 119 constitute a pair of telescoping members with the member 105, 119 of adjustable length (via threading 119 into and out of 105).

Secured on the flange 19f of each tube reinforcing ring 19 on each of the two tubes TL and TR is a fitting 135 for receiving the ends of the links 97. This fitting is constituted by an elongate casting generally of channel shape in transverse cross section having a web 137 and side flanges 139. The web 137 is longitudinally curved to fit against the flange 19f of a reinforcing ring 19. The fitting has a flat wall 141 at one end, and a curved wall 143 at its other end, and a transverse partition 145 extending between its side flanges spaced about one-third the overall length of the fitting from end wall 143. The fittings are located on the opposed sides of the two tubes, above the horizontal central plane of the tubes. Each fitting is secured to the respective reinforcing ring with its curved end wall 143 up. The side flanges 139, end wall 141 and partition 145 define a recess 146.

Each link 97 in the set L1 of links has the rounded end 101 of the rod 99 received in the lower end of the recess 146 in the respective fitting 135 on tube TR engaging the end wall 141 of this fitting and the rounded outer end 134 of extension 119 received in the upper end of the recess 146 in the respective fitting 135 on tube TL engaging the partition 145 of the latter fitting. Similarly, each link 97 in the set L2 of links has the rounded end 101 of the rod 99 received in the lower end of recess 146 in the respective fitting on tube TL engaging the end wall 141 of this fitting and the rounded end 134 of extension 119 received in the upper end of the recess 146 in the respective fitting 135 on tube TR engaging the partition 145 of the latter fitting.

A platform 147 is provided between the tubes TL and TR above the horizontal central plane of the tubes but below the upper ends of the links 97 constituting a floor on which workmen may stand to adjust the links 97. This platform or floor 147 is comprised of individual rectangular sections 149 (see FIG. 7) which fit in between adjacent reinforcing rings 19 of the tubes, these sections having their corners bearing on gusset plates 151 welded to the tubes and reinforcing rings 19. These four sections are not secured in any way to the tubes so that the tubes are free to shift longitudinally and laterally relative to one another. Ladder rungs may be provided as indicated at 153 in FIG. 1 for workmen to climb up to and down from the platform.

Figure 5:
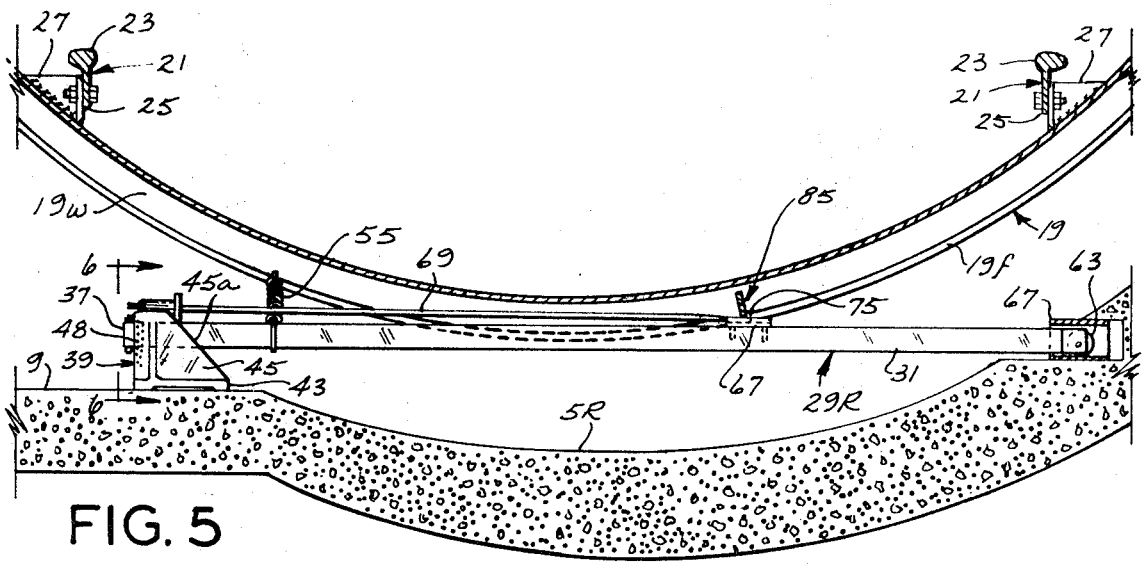
FIG. 5 is an enlarged fragment of FIG. 1.
Figure 6:
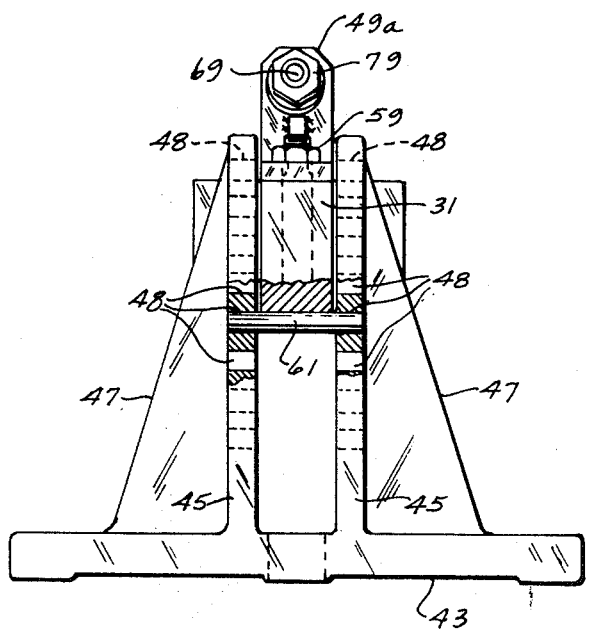
FIG. 6 is an enlarged section on line 6—6 of FIG. 5.
Figure 7:
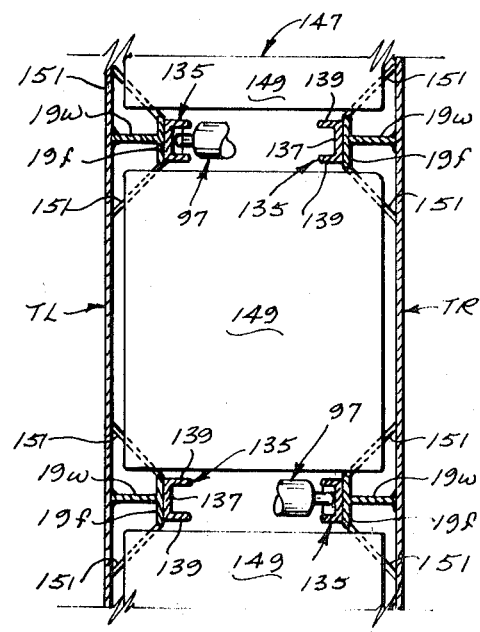
FIG. 7 is a fragmentary plan on line 7—7 of FIG. 1, with parts broken away.

Coil tension springs 155 may be connected between beams 31 and the reinforcing rings 19 of the tubes as shown in FIGS. 4 and 5, to control longitudinal shifting of the tubes and may be used particularly on a long sloping reach of the tunnel and the tubes to oppose a longitudinal load buildup.

It will be observed that each tube TL, TR is vertically sprung, i.e., resiliently supported for vertical movement, by the resilient supporting beams or spring bars 31 of the respective spring bed (29L or 29R), and that each tube is horizontally sprung, i.e., resiliently supported for lateral movement, by means of its resilient keel 83. With the crossed arrangement of links 97, the structure is essentially that of a three-hinged arch, the effective hinge axes being at the bottom edges of the keels 83 and the line of intersection of the planes of the two sets L1 and L2 of links 97. As a result, the weight of the two tubes TL, TR tends to spread apart laterally at their keels 83, thus providing gravity bias in the lateral direction so that the weight of each tube maintains a positive load on the upturned end hooks 75 of the respective rods 69. Initial vertical positioning of each tube is effected via appropriate positioning of the pins 61 which support the inboard ends of the resilient beams 31 in selected pinholes 48 in the sidewalls 45 of bracket 43. Lateral positioning of the tubes relative to the beams is effected by adjustment of the position of the hooked ends 75 of the rods 69 by means of the adjustment nuts 79 (i.e., by adjusting the hooked ends of the rods in both spring beds 29L, 29R toward the left, the tubes are adjusted toward the left, and vice versa). Due to the springiness of each keel plate 85, it is possible to make a sizeable adjustment (e.g., one-eighth inch) of a plate without excessive loading. To move the tubes TL and TR apart, all the links 97 are lengthened and adjustment nuts 79 are loosened accordingly; to move the tubes closer together, all the links 97 are shortened and nuts 79 are tightened. To shift one tube vertically relative to the other, the links of one set (e.g., set L1) are lengthened and the links of the other set (e.g., set L2) are shortened, with corresponding changes in vertical position of pins 61. Roll adjustment of either tube TL or TR may be effected by adjustment of the hooked ends 75 of the rods 69 of its spring bed only, plus corresponding changes in length of links 97 (note that this in effect rotates the tube).

The construction is such that all the above adjustments are possible without impeding the longitudinal freedom, at least for a limited distance such as ±2 inches, between the two tubes. That is, either tube TL or TR is free to shift longitudinally at least ±2 inches relative to the other without excessive secondary effects. This is permitted by sliding of the keel 83 on the guides 67 on the beams 31 and by making links 97 of such length (approximately 15 inches in the case of 10-foot-diameter tubes, for example) that the links are adapted to become inclined in the longitudinal direction of the tubes on relative longitudinal shift of the tubes. By incorporating springs 109 in the links 97 (as well as making them adjustable), the links are made capable of finite adjustment without causing undue loading on the tubes TL, TR or on the links themselves. The tubes are so rigid that, if the links 97 were not made resiliently compressible, it would not be possible to increase the length adjustment of any one link more than a few hundredths of an inch without subjecting it to very great loads; however, with springs 109 (and 131) incorporated in the links substantially as herein shown, any one link can be adjusted as much as one-eighth inch without undue loading. Thus, if it should be necessary to make a gross adjustment in the relationships between the two tubes TL and TR, a single workman can progress along the tubes (on the platform or floor 147) making adjustments as much as one-eighth inch at a time without concern about local overloading. It is also to be noted that the platform or floor 147 has very little resistance to either longitudinal or transverse relative shifts of the tubes. As above mentioned, tension springs 155 may be used even on level reaches of a tube to control the tendency of the tube to shift longitudinally on an emergency stop of the vehicle therein. It is also contemplated that, on account of this tendency and for other reasons, the pair of tubes TL and TR may be longitudinally cross-connected at a single point in the distance from one station to next, most likely midway between the two stations. This cross connection must be capable of cross-transferring half the longitudinal load imposed on the vehicle in an emergency stop (e.g., a force in the order of 100,000 pounds), and should not interfere with cross transfer of loads by the links.

It is possible to test the loading on the various springs of the above-described suspension at any time and verify that adjustments are as desired. Thus, the load on the resilient beams or spring bars may be checked with a portable hydraulic jack by utilizing the jack to lift the inboard end of a beam off its supporting pin; a hydraulic pressure gauge reading will then give an accurate measure of the vertical load being carried by that beam. The loading of a keel plate can be checked by "t-wanging" the respective rod (which is in tension) and observing the frequency. The same applies to the springs 155. The loads in the links 97 (which constitute diagonal braces between the tubes) can be checked with a hydraulic or pneumatic tool adapted to compress a link slightly, thus transferring the load from the link to the tool. All these checks are possible because of the great redundancy of springs; considerable change at any one of them does not cause the tube to shift appreciably. It may be debated as to whether the load on the springs is critical to this extent; however, the more important objective is to verify that the tube itself is not being subjected to excessive local loading which could cause it to fail with the passage of time. With these precautions, the tubes should be able to last a lifetime comparable to that of a bridge or other major present-day structure.

As above noted, the tubes TL and TR are mounted on the supporting means therefor constituted by the beds 29L, 29R on the bottom of the tunnel in the manner of a three-hinged arch by what amount to two lower hinge connections comprising the keels 83 and an upper hinge connection between the two tubes comprising the crossed links 97 above the level of the lower hinge connections at 83. The pivot axis of the upper hinge connection is the line of intersection of the planes of the two sets L1 and L2 of links 97. Each side of the three-hinged arch consists primarily of the reinforcing rings 19 of the respective tube. Each lower hinge connection at 83 lies outboard of the center of gravity of the respective tube to assure compressive loads at the upper hinge connection formed by links 97. The three-hinged arch arrangement has vertical and lateral resilience at each of the three hinge connections, and is capable of vertical and lateral adjustment at each of the three hinge connections. The vertical resilience at the lower hinge connections results from the use of the resilient transverse beams 31. The lateral resilience at the lower hinge connections results from the resiliency of the keels 83. The vertical and lateral resilience at the upper hinge connection results from the links 97 being spring links (i.e., longitudinally resilient). Provision for vertical adjustment at the lower hinge connections results from the provision of means 61, 48 for vertical adjustment of the inboard ends of beams 31. Provision for lateral adjustment at the lower hinge connections is via the adjusting rods 69 operable from the inboard ends of beams 31. Provision for vertical and lateral adjustment of the upper hinge connection is via the adjustability in length of the links 97. Also, each tube TL or TR is longitudinally shiftable relative to its bed 29L or 29R via the slidability of the respective keel in longitudinal direction relative to the tubes on beams 31, and each tube is longitudinally shiftable relative to the other via the provision of the rounded ends 101 and 134 on the links 97, whereby each link has a universally rotatable connection at each end with the tubes via the fittings 135 on rings 19.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What I claim is:

1. A high-speed ground transportation system comprising a pair of tubes extending side by side each adapted for travel therethrough of a vehicle, means for supporting the tubes, and means mounting said tubes on said supporting means in the manner of a three-hinged arch comprising a lower hinge connection between each tube and the supporting means and an upper hinge connection between the two tubes above the level of the lower hinge connections, the tubes being free of one another apart from said upper hinge connection and said supporting means.

2. A high-speed ground transportation system as set forth in claim 1 wherein each tube comprises a shell having reinforcing rings and said upper hinge connection is between reinforcing rings of the two tubes.

3. A high-speed ground transportation system as set forth in claim 1 wherein each lower hinge connection is located outboard of the center of gravity of the respective tube to assure compressive loads at the upper hinge connection.

4. A high-speed ground transportation system as set forth in claim 1 wherein the supporting means for each tube comprises a series of transverse beams and each lower hinge connection comprises a longitudinal keel member at the bottom of the respective tube bearing on the transverse beams.

5. A high-speed ground transportation system as set forth in claim 1 wherein the upper hinge connection consists of two sets of diagonal links, the links of the two sets being oppositely inclined and alternating with one another along the length of the tubes.

6. A high-speed ground transportation system as set forth in claim 1 having vertical and lateral resilience at each of the three hinge connections.

7. A high-speed ground transportation system as set forth in claim 6 wherein vertical resilience at the lower hinge connections is achieved by use of resilient transverse beams as said supporting means.

8. A high-speed ground transportation system as set forth in claim 6 wherein the lateral resilience at the lower hinge connections is achieved by means of resilient keel members, one for each lower hinge connection, at the bottoms of the tubes.

9. A high-speed ground transportation system as set forth in claim 6 wherein the upper hinge connection consists of two sets of diagonal links, each of which is longitudinally resilient, the links of the two sets being oppositely inclined and alternating with one another along the length of the tubes.

10. A high-speed ground transportation system as set forth in claim 1 having provision for vertical and lateral adjustment at each of the three hinge connections.

11. A high-speed ground transportation system as set forth in claim 10 wherein the supporting means for each tube comprises a series of transverse beams and wherein provision for vertical adjustment at the lower hinge connections is achieved by means for vertical adjustment of the inboard end of each transverse beam.

12. A high-speed ground transportation system as set forth in claim 10 wherein the supporting means for each tube comprises a series of transverse beams, and the lower hinge connection for each tube comprises a longitudinal keel member at the bottom of the tube, and wherein lateral adjustment at each lower hinge connection is achieved by means for adjusting the respective keel member along the transverse beams, said adjusting means being operable from the inboard ends of the transverse beams.

13. A high-speed ground transportation system as set forth in claim 10 wherein the upper hinge connection consists of two sets of diagonal links, the links of the two sets being oppositely inclined and alternating with one another along the length of the tubes, and wherein provision is made for vertical and lateral adjustment at the upper hinge connection by making said links adjustable in length.

14. A high-speed ground transportation system as set forth in claim 1 wherein each tube is longitudinally shiftable relative to its said supporting means and relative to the opposite tube.

15. A high-speed ground transportation system as set forth in claim 14 wherein the supporting means for each tube comprises a series of transverse beams, and wherein each lower hinge connection comprises a longitudinal keel member at the bottom of the respective tube bearing on the transverse beams and slidable in longitudinal direction relative to the tubes on the transverse beams.

16. A high-speed ground transportation system as set forth in claim 14 wherein the upper hinge connection consists of two sets of diagonal links, the links of the two sets being oppositely inclined and alternating with one another along the length of the tubes, each link having a universally rotatable connection at both ends with the tubes providing for longitudinal shift of either one of the tubes relative to the other.

17. A high-speed ground transportation system comprising a pair of tubes each adapted for travel therethrough of a vehicle, said tubes extending side by side with a space therebetween, a resilient bed for each tube, each bed resiliently supporting the respective tube for vertical springing of the tube, each tube having a laterally resilient keel at the bottom thereof bearing on the resilient bed and adjustable laterally on the bed, each keel being laterally resilient for horizontal springing of the respective tube, and first and second sets of inclined links interposed between the two tubes in the space therebetween, each link being adjustable in length, the links of the two sets being oppositely inclined and alternating with one another along the length of the tubes, the links of the two sets being arranged in crossing relationship.

18. A high-speed ground transportation system as set forth in claim 16 wherein each said resilient bed comprises a series of resilient beams extending transversely with respect to the respective tube underneath the latter, the keel bearing on these beams intermediate the ends of the beams.

19. A high-speed ground transportation system as set forth in claim 18 having means for mounting one end of each beam for vertical adjustment and means for mounting the other end of each beam for movement in the direction of the length of the beam.

20. A high-speed ground transportation system as set forth in claim 19 having means accessible from between the tubes for adjusting each keel lengthwise of the respective beam.

21. A high-speed ground transportation system as set forth in claim 20 wherein said adjusting means comprises a rod extending lengthwise of each beam on top of the beam, means on each beam at its inboard end for lengthwise adjustment of the rod, said rod having means at its outer end engageable with the keel.

22. A high-speed ground transportation system as set forth in claim 21 wherein each tube has exterior reinforcing rings spaced at intervals along its length and the keel of each tube comprises a plurality of individual keel plates each extending from ring to ring of the tube in a common plane extending radially outward in relation to the tube.

23. A high-speed ground transportation system as set forth in claim 22 wherein each keel plate has its lower edge in slidable engagement with a beam generally at the center of length of the keel plate.

24. A high-speed ground transportation system as set forth in claim 23 wherein said adjusting means comprises a rod extending lengthwise of each beam on top of the beam through a hole in a bracket at the inboard end of the beam, an adjustment nut threaded on the inboard end of the rod, the rod having means at its outer end engageable with a keel plate, the keel plate being longitudinally slidable relative to said means.

25. A high-speed ground transportation system as set forth in claim 17 wherein each link has two telescoping members, one of which is of adjustable length, and compression spring means interposed between said members.

26. A high-speed ground transportation system as set forth in claim 17 wherein said links are located above the horizontal central plane of the tubes, and wherein a platform is provided in the space between the tubes on which a workman may stand to adjust the links, the mounting for the platform leaving the tubes free to shift longitudinally and laterally relative to one another.